US009009753B2

(12) United States Patent
Agarwal et al.

(10) Patent No.: US 9,009,753 B2
(45) Date of Patent: Apr. 14, 2015

(54) MEASUREMENT AND REPORTING OF SET TOP BOX INSERTED AD IMPRESSIONS

(75) Inventors: Gaurav Agarwal, San Francisco, CA (US); David de Heer, Woodside, CA (US); Majd Bakar, San Jose, CA (US); Francis Tsui, Belmont, CA (US); Victor Lee, Cupertino, CA (US); Pradip Fatehpuria, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 589 days.

(21) Appl. No.: 12/409,767

(22) Filed: Mar. 24, 2009

(65) Prior Publication Data

US 2010/0251278 A1 Sep. 30, 2010

(51) Int. Cl.

*H04N 7/10* (2006.01)
*H04N 7/025* (2006.01)
*H04H 20/14* (2008.01)
*H04H 20/10* (2008.01)

(52) U.S. Cl.

CPC ............. *H04H 20/14* (2013.01); *H04H 20/106* (2013.01)

(58) Field of Classification Search

None
See application file for complete search history.

(56) References Cited

U.S. PATENT DOCUMENTS

| | | | | |
|---|---|---|---|---|
| 5,774,170 | A | 6/1998 | Hite et al. | |
| 6,446,261 | B1 | 9/2002 | Rosser | |
| 7,152,237 | B2 | 12/2006 | Flickinger et al. | |
| 7,720,432 | B1 | 5/2010 | Colby et al. | |
| 7,870,576 | B2 | 1/2011 | Eldering | |
| 2002/0083439 | A1 | 6/2002 | Eldering | |
| 2003/0177490 | A1* | 9/2003 | Hoshino et al. | 725/34 |
| 2003/0188308 | A1* | 10/2003 | Kizuka | 725/32 |
| 2004/0103429 | A1 | 5/2004 | Carlucci et al. | |
| 2004/0194131 | A1 | 9/2004 | Ellis et al. | |
| 2005/0283796 | A1* | 12/2005 | Flickinger | 725/35 |
| 2007/0089127 | A1 | 4/2007 | Flickinger et al. | |
| 2007/0136742 | A1 | 6/2007 | Sparrell | |
| 2007/0283384 | A1 | 12/2007 | Haeuser | |

(Continued)

FOREIGN PATENT DOCUMENTS

| | | | |
|---|---|---|---|
| WO | 03019444 | A1 | 3/2003 |
| WO | 2006076581 | A2 | 8/2006 |

OTHER PUBLICATIONS

Brian Tarran, STB Measurement Builds Momentum in TV Biz, Research Magazine, Sep. 9, 2008, http://www.research-live.com/news_story.aspx?pageid=30&r=y&newsid=5148.

(Continued)

*Primary Examiner* — Nasser Goodarzi
*Assistant Examiner* — Fred Peng
(74) *Attorney, Agent, or Firm* — Jeremy Snodgrass; Judy Yee; Micky Minhas

(57) ABSTRACT

Methods are disclosed for measuring ad impressions and receiving feedback on local ad assets inserted into a video transport stream at the set top box level. Each set top box stores the number of times an ad asset is inserted into an ad avail, along with a variety of other information relating to the playback of the ad asset. This measurement data is aggregated and sent to the ad decision service. In order to balance bandwidth usage, each set top box may report its measurement data to the ad decision service at a different time interval that is randomly selected. As it is desirable to receive the data in a timely manner, the random intervals may be confined so that all measurement data is reported within a predefined time period, such as for example over a twelve hour period.

16 Claims, 5 Drawing Sheets

(56) References Cited

U.S. PATENT DOCUMENTS

| | | | | |
|---|---|---|---|---|
| 2008/0052741 | A1 | 2/2008 | Dharmaji | |
| 2008/0060002 | A1 * | 3/2008 | Noll et al. | 725/35 |
| 2008/0127245 | A1 | 5/2008 | Olds | |
| 2008/0250448 | A1 | 10/2008 | Rowe et al. | |
| 2008/0271069 | A1 | 10/2008 | Kim et al. | |
| 2008/0276270 | A1 * | 11/2008 | Kotaru et al. | 725/34 |
| 2008/0276271 | A1 * | 11/2008 | Anderson et al. | 725/34 |
| 2008/0288975 | A1 | 11/2008 | Chen et al. | |
| 2009/0070806 | A1 * | 3/2009 | Flickinger | 725/34 |
| 2009/0165041 | A1 * | 6/2009 | Penberthy et al. | 725/34 |
| 2009/0210901 | A1 * | 8/2009 | Hawkins et al. | 725/34 |
| 2010/0043022 | A1 | 2/2010 | Kaftan | |
| 2010/0251289 | A1 | 9/2010 | Agarwal | |
| 2011/0004899 | A1 * | 1/2011 | Medford | 725/32 |

OTHER PUBLICATIONS

NDS Dynamic End-to-End TV Advertising Solutions, NDS, 4 pages, http://www.nds.com/pdfs/NDS_Dynamic_datasheet.pdf.

Emerging IPTV Advertising Opportunities, TMCnet.com, website, Oct. 8, 2008, http://next-generation-communications.tmcnet.com/topics/service-provider/articles/42283-emerging-iptv-advertising-opportunities.htm.

Digital Measurement for a Digital World, TNS Media Research, website, http://www.tns-mr.com/ourExpertise.htm.

NDS and TNS Join Forces to Develop Set-Top Box Audience Measurement Solution, Reuters, website, Sep. 9, 2008, http://www.reuters.com/article/pressRelease/idUS62577+09-Sep-2008+BW20080909.

Office Action dated Jan. 21, 2014 in U.S. Appl. No. 12/409,744.

TMCNET Special Guest, Emerging IPTV Advertising Opportunities, website, Oct. 8, 2008, 10 pages, http://next-generation-communications.tmcnet.com/topics/service-provider/articles/42283-emerging-iptv-advertising-opportunities.htm.

Steve Riedl, Individually Targeted Advertising in a Switched Services Environment, BigBand Networks, 6 pages, http://www.bigbandnet.com/index.php/tech_whitepaper_ncta2.html <retrieved from Internet Feb. 16, 2009>.

Tom Morrod, Microsoft Mediaroom Pushes Forward with Live Ad Insertion Technology, website, screendigest, Oct. 21, 2008, http://www.screendigest.com/online_services/intelligence/tvtech/updates/tv_tech_211008-tm1/view.html.

Content Delivery, website, Hinditron: Better Life Through Technology, SeaChange, http://www.hinditron.com/convergence-solutions/content-delivery.htm <retrieved from Internet Feb. 16, 2009>.

Interactive Advertising Whitepaper, Open Tv, 24 pages, http://inusual.tv/wp-content/uploads/2006/09/OpenTV_Interactive_Advertising_White_Paper_April_2005.pdf.

Guy Cherry, Adaptive Advertising: Definitions, Scenarios and Standards, website, Communications Technology, Jan. 1, 2007, http://www.cablefax.com/ct/strategy/businesscases/21347.html.

Society of Cable Telecommunications Engineers, ANSI/SCTE 35 2007, Digital Program Insertion Cueing Message for Cable, 2007.

Office Action dated Jun. 24, 2011 in U.S. Appl. No. 12/409,744.

Response to Office Action dated Oct. 24, 2011 in U.S. Appl. No. 12/409,744.

Final Office Action dated Jan. 10, 2012 in U.S. Appl. No. 12/409,744.

Response to Final Office Action dated Jun. 11, 2012 in U.S. Appl. No. 12/409,744.

Response to Office Action filed May 21, 2014 in U.S. Appl. No. 12/409,744.

Final Office Action dated Aug. 22, 2014 in U.S. Appl. No. 12/409,744.

Response to Office Action filed Nov. 24, 2014 in U.S. Appl. No. 12/409,744.

Notice of Allowance and Fee(s) Due dated Dec. 3, 2014 in U.S. Appl. No. 12/409,744.

* cited by examiner

MEASUREMENT AND REPORTING OF SET TOP BOX INSERTED AD IMPRESSIONS

BACKGROUND

A main source of revenue for national television broadcasters and their local broadcast affiliates is the sale of broadcast airtime to advertisers that want to promote their goods and/or services. Similarly, cable network and IPTV providers derive income from the sale of advertising time and subscription fees. Advertisers want their advertisements (ads) to be shown to those viewers that are likely to be interested in their products and/or services. One common technique is to target viewers according to a particular type of television programming. For example, an advertiser may determine that men who watch sports are more likely to purchase a pickup or sport utility vehicle rather than another type of automobile. Accordingly, the advertiser may then purchase ad space during a broadcast of a football game. Another common technique to target viewers is according to geographic area. For example, viewers in one local or regional area may likely be more interested in goods and/or services from a particular advertiser than viewers in a different area.

"Local ad insertion" is a business practice used by television affiliates, re-broadcasters, and service providers to sell advertising airtime for a limited geographical area. Local ad insertion was originally designed for analog television media and each different geographical area where ads can be inserted at the service level requires a different service to be continually available for each of the different local ads. The services, however, will carry the same content nearly all of the time, and only differ when local ads are inserted for a brief period of time. A standard released by the Society of Cable Television Engineers (SCTE) for program substitution and advertisement insertion for MPEG-2 broadcast systems is ANSI/SCTE35 which details how splice points can be transmitted directly in an MPEG-2 transport stream. In particular, a content generator will specify points during their content playback at which advertisements may be inserted. These locations at which these points occur may be well known in advance, or they may be variable as in the case of sporting and other live events. SCTE35 is utilized for local ad insertion for MPEG-2 content.

While strides have been made in targeting advertisements to more granular levels of viewers, conventional systems do not provide effective systems that are able to insert advertisements at the set top box level in any semblance of real time. This inability presents certain drawbacks. For example, conventional systems do not attain the granularity of targeting users associated with a specific set top box. Thus, conventional models by definition send out ads to at least some users who do not fit the demographic. Moreover, today's advertisers depend on TV ratings from Nielsen Media Research and Taylor Nelson Sofres market research data. However, such data is only based on sample sets and surveys and may not be accurate. There is a pressing need for complete, relevant and accurate measurement data and feedback that will be valuable and rewarded by advertisers.

Further still, conventional systems do not monitor the specific number of times an ad is shown on a viewer-by-viewer basis, and are not well-equipped to control the specific number of times an ad is displayed. In particular, ads may be selected for local ad insertion, and it is only after the fact that the number of ad displays may be determined. That can have at least two side effects. First, an advertiser may specify that it wants its ad to run 1000 times, and will only pay for those 1000 ad inserts. Conventional television systems do not closely monitor how often the ad is run, and the ad may run more than 1000 times. The disadvantage here is that the additional broadcasts of the ad do not generate any revenue, and those inserts could have been filled with other ads that would have generated revenue. Second, it may happen that an ad is displayed too many times within a given period of time. This may result in so-called ad fatigue where the viewer develops a negative association with the ad, not because of the content, but because of how often it is being shown.

DVR recording and later playback of content also presents problems for advertisers. An ad may be for a particular event or otherwise timely when shown in a live broadcast of content. However, if that content is recorded for later playback, the ad may not be viewed until after the event or until after the ad has otherwise become stale. In this instance, the viewer no longer has any need to view the ad, and the advertiser no longer has any need to pay for the ad.

SUMMARY

The present system, roughly described, relates to methods of measuring ad impressions and receiving feedback on local ad assets inserted into a video transport stream at the set top box level. The media advertising platform of the present system works in conjunction with existing platforms, such as an advertising decision service and a media platform. The present system further includes a client resident on end user set top boxes. The media advertising platform, advertising decision service and media platform together form a backend which communicates with the set top box client to provide an integrated, end to end system for inserting local ads into video streams at the set top box level and for measuring ad impressions and receiving feedback on the inserted ad assets.

In general, the present system provides a variety of data and tools for advanced measurement and tracking of every ad asset served by all set top boxes in the network. Ad assets are pre-cached at the set top box. Upon detection of an ad avail, the set top box selects ad assets for insertion into the ad avail based on a decision matrix worked out by the advertising decision service and forwarded to the set top box. Each set top box stores the number of times an ad asset is inserted into an ad avail, along with a variety of other information relating to the playback of the ad asset. This additional information includes, for example, whether the ad asset was available for playback when selected, whether it played properly and whether the user fast-forwarded, rewound or paused the playback of the ad asset. This data is recorded whether the ad asset is played back live or recorded for later playback.

This measurement data is aggregated and sent to the ad decision service. In order to balance bandwidth usage, each set top box may report its measurement data to the ad decision service at a different time interval that is randomly selected. As it is desirable to receive the data in a timely manner, the random intervals may be confined so that all measurement data is reported within a predefined time period, such as for example over a twelve hour period.

DETAILED DESCRIPTION

Embodiments of the system will now be described with reference to FIGS. 1-5, which in general relate to methods for dynamic local ad insertion at the set top box level. The present system receives an ad campaign from an advertiser and creates a group for that advertisement. Users will be assigned to that group depending on an abstract set of various targeting criteria including for example demographics, geography, stored hobbies, etc. An advertising decision service forming part of a backend platform evaluates the ads from the various ad campaigns that are then active, and periodically downloads to a client on user set top boxes a decision matrix of which ads are the preferred ads to insert based in part on the groups to which the users belong. Using the decision matrix and other criteria, the set top box is able to determine what ads to insert upon detection of an ad marker in the playback stream. Ads are pre-cached on the set top box when bandwidth is available so that selected ads may be inserted when selected. Ads may be dynamically inserted during both live and time-shifted (recorded) playback of content. Each of these features is described in greater detail below.

In one example, the present system may be implemented on a two-way digital infrastructure where media content is transmitted from a source to a broad geographic region, one or more sub-divided geographic regions (e.g., designated market areas), and/or one or more further sub-divided geographic regions (e.g., zones). Traditional pre-scheduled ads may be inserted by the content transmitter at any one of these transmission/retransmission points at the SCTE35 markers. The SCTE35 markers are set forth in the SCTE35 protocol, which is incorporated herein in its entirety. Instead of pre-scheduled ads, ads may be dynamically inserted by the set top box of individual users in accordance with the present system as explained below.

Figure 1:
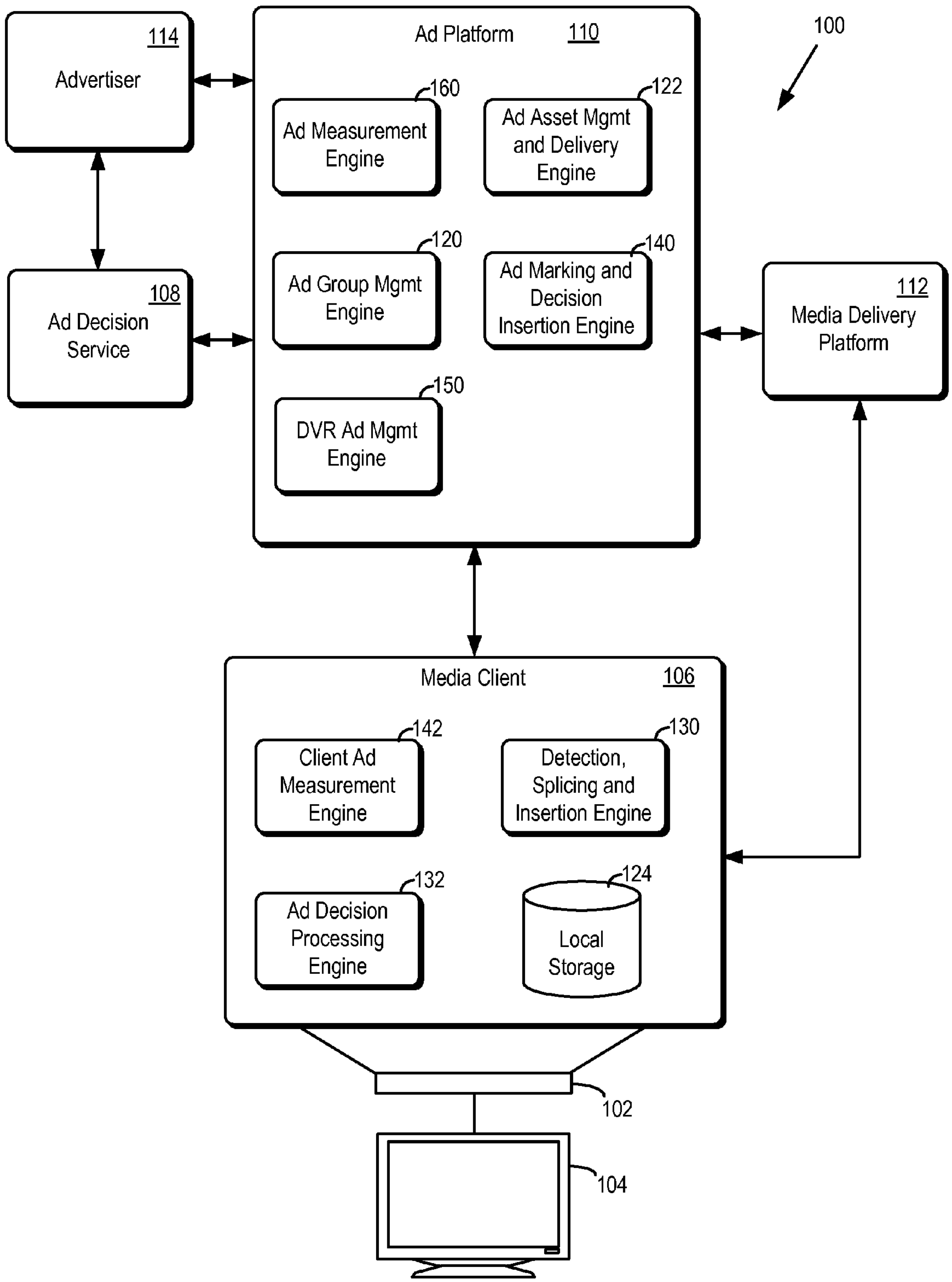
FIG. 1 is a block diagram of an architecture for local set top box ad insertion according to an embodiment of the present system.

FIG. 1 shows a high level block diagram of a system 100 for implementing local ad insertion at the set top box level. In general, a service provider (such as for example a telephone carrier, cable carrier or IP TV service) delivers media content to a set top box (also referred to as STB) 102 associated with a viewing device 104 which may be a television or a monitor. While the following description refers to a set top box, it is understood that the set top box is only one example of a variety of other end user client devices which may implement ad insertion according to the present system. In addition to a set top box, these client devices include for example TVs, DVD players, PCs, or other devices capable of serving as end-points in a digital TV system. The STB 102 may include a software client application 106 responsible for carrying out aspects of the present system at the set top box level. The service provider in turn controls an ad decision service 108, an ad platform 110 and a media delivery platform 112, which together form a backend of the present system.

Ad campaigns are created by advertisers 114 and the ad campaign including information about an ad is provided to the ad decision service 108. The ad decision service is in general an existing platform with augmented capabilities per the present system as explained below. The ads, or ad assets, may be formatted and encoded according to known video standards, and may be made available by the advertiser two or more days before it is scheduled to be targeted at the set top box as explained below. This length of time may be more or less than three days in further embodiments. By way of example only, an ad asset may run from one week to about six months. In an embodiment, 3000 ad assets may be handled by each designated market area or comparable sized area, with the refresh rate of about 100 new ad assets daily. Again, these numbers are by way of example, and may vary above and/or below these numbers in further embodiments. There is expected to be some overlap between ad assets across regions, but a significant percentage of ad assets may be unique in every region. Ad assets may typically be an audio/video stream, but an ad asset may be more or other than an audio/video stream in alternative embodiments. The ad asset could be an application or some other overlay that runs concurrently with the underlying content stream. The ad asset could also be an audio track or alternate audio.

In accordance with the present system, at the time an ad asset is created, the ad decision service 108 also creates a group, and maps one or more set top boxes to that group. In general, if the advertiser just selected attributes and those attributes were sent directly to the set top box clients, then the clients would have to match an arbitrarily long set of attribute Booleans to its known characteristics, which would take a great deal of processing power on devices that typically aren't very powerful. Therefore, by pre-computing group memberships and propagating those to the clients ahead of time, the clients don't need to do the computations themselves in close to real-time.

A group may be defined as a set of set top boxes 102 of users that share the same set of attributes (such as demographics, geography, behavior, psychographics, etc). These attributes are selected by the advertiser 114, and may be any number of attributes targeted by the advertiser. The attributes used in defining groups may be related to the user's television viewing habits, or may be unrelated to the user's television viewing habits. In particular, the media service provider stores attributes relating to the user. These attributes may be geographical (where the user lives), demographical (age, gender, income) psychographical (such as attitudes and values), what the user watches, who the user telephones, what websites the user accesses, etc. Groups may be formed using any attribute from these categories or others.

User attributes are stored by the ad decision service 108, so that when a new ad campaign is created, a new group and group ID may also be created. User set top boxes are assigned to newly created groups based on a correlation between the user attributes and the target audience for an ad as dictated by the advertiser. Membership in a group is done at the set top box level. Thus, a single household may have for example four different set top boxes, and each set top box may belong to different groups, depending on the user habits or other attributes of the users of the respective set top boxes.

An ad campaign may target more than one group. For example, if an advertiser wants to create a campaign for three of its ad creatives targeting different user profiles, it may create three different groups. One of the groups (say for a pickup truck) may target males between 25 and 40 who live in Texas and watch football. A second group (say for a small car) may target females between 18 and 30 living in major cities such as Los Angeles and San Francisco. A third group (say for a sedan) may target the rest of the population who fall outside the other two groups. These groups are three of many possible examples.

For every new ad campaign, a new group may be created. Also, for every ad campaign that has ended, a group may be removed. While the different attributes which may be targeted by a group are nearly limitless, a limit may be provided for the purposes of the present system. For example, the system may have a limit of 65,000 groups, though the number may be higher or lower than that in further embodiments. In practice, groups will be shared between campaigns and creatives, since many of the same attributes will be targeted by the campaigns. Targeting is achieved in orders of groups, and decisions define mapping of groups to appropriate ad creatives as explained below.

Groups are created by the ad decision service 108, and the service 108 also assigns set top boxes to a given group. The ad platform 110 includes an ad group management engine 120. The ad group management engine 120 periodically sends a list to each STB 102 of all of the groups to which each STB 102 belongs. Each STB 102 may store this list in local storage 124 for use as explained hereinafter. The ad group management engine 120 may refresh group membership periodically or provide membership updates as and when needed. In one embodiment, group membership may be sent down to the STB 102 every eight hours, though it may be more or less than that in further embodiments. In addition to a periodic push of group membership to STB 102, an STB 102 may request group membership from the ad group management engine 120, such as for example upon boot up of the STB 102.

In addition to group membership, the ad assets are also sent down and cached on the media client 106 of STB 102. As there can be thousands of ads for millions of set top boxes at a given time, distribution of these ads to all set top boxes needs to be managed. As such, the present system further includes an ad asset management and delivery engine 122 for managing and delivering ad assets and associated metadata to set top boxes 102. The ad asset management and delivery engine 122 can deliver to all set top boxes 102 within the service provider network, or only selected set top boxes. The ad asset management and delivery engine 122 also manages removal of an ad asset from STB 102 when an ad campaign has ended.

A large number of new ads, for example 100, are created every day which are pre-cached onto each set top box in the network. In order to efficiently accomplish this, the ad asset management and delivery engine 122 includes a multicast ad carousel that stores all new ads and continuously multicasts the new ads to all set top boxes 102. The ad carousel cycles through the transmission of the new ads, possibly several times in one day. The carousel has the ability to prioritize and order assets on the carousel, as well as define the frequency with which particular ad assets are broadcast by the ad carousel.

When bandwidth is available on an STB 102, the client 106 tunes into the carousel to receive new ads. Newly received ads are stored in local storage 124. Local storage 124 may be part of the client 106, or it may reside within a different client device within the subscriber's home network. If bandwidth is in use and not available, the client may wait until bandwidth is available and then tune into the ad carousel. Transmission errors may occur resulting in missing packets, or "holes," in the ad assets from the carousel, or it may happen that client 106 was tuned to the carousel long enough to receive only part of an ad asset. In these instances, the client is able to determine how much of the ad was received, and can tune in to capture the remaining portion of the ad at a subsequent broadcast of the ad asset by the ad carousel.

In addition to the ad assets themselves, the ad asset management and delivery engine 122 may also deliver a manifest of all daily ads being sent on a given day. The manifest guides the client 106 as to when to tune to the carousel to receive new content or to complete the reception of one or more ads. As the carousel cycles through all new ad assets, for example every three to five hours, this system will typically be sufficient to allow all new ads to be pre-cached in local ad storage 124 on a daily basis.

The ad carousel provides a multicast of new ad assets to all set top boxes in the network. However, it may happen that a particular STB 102 needs more than just the current day's ad assets as directed by the ad manifest. The client device may be newly registered, the STB 102 may be new or replaced, or the STB may have been turned off for an extended period of time. In such cases, the client 106 may contact the ad platform 110 to request a download of any or all ad assets (i.e., those for the current day and all active ad assets from prior days). In one embodiment, the ad asset management and delivery engine 122 may work with media delivery platform 112 for unicast delivery of any or all active ad assets to an STB 102. Media delivery platform 112 may be an existing platform including video-on-demand (VOD) servers for delivering VOD to STB 102. Additional APIs may be added to the VOD servers that allow the VOD servers to deliver ad assets to an STB 102. Using the existing VOD media platform minimizes the requirement of new hardware. Another advantage of using the existing VOD media server to host ads is that the VOD servers may be used to provide one common store for all ads in the system backend.

The ad assets that are sent daily by the ad carousel are also sent to the VOD server, so that if a particular STB requests unicast transmission of ad assets, the VOD server has all of the current ad assets the STB 102 requires. As with the ad asset management and delivery engine 122, the VOD servers may also include a manifest which can be compared against a manifest on the client 106 to determine which ad assets to download. A manifest may be sent down from the ad asset management and delivery engine 122 and/or VOD servers periodically, for example once every thirty minutes, alerting the client 106 as to which ads it needs to store, which ads it needs to delete, which ads it needs to pick up from the daily ad carousel and which ads it needs to fetch using the unicast approach.

In embodiments, the VOD server prioritizes VOD sessions over ad sessions to ensure that VOD availability and performance is not impacted. A blackout period can also be specified in the manifest to indicate heavy usage periods in the day such as primetime when the VOD servers will not be contacted by the clients for download of ads.

In the above-described embodiment, all ad assets which could possibly be inserted in a local ad insert are pre-cached in storage 124 so that selected ads may be quickly and easily inserted by the client 106 as explained below. As storage space is relatively inexpensive, storing what may be thousands of ad assets which could possibly be selected for insertion is not a prohibitive constraint. However, in alternative embodiments, it is understood that a filtering process may be applied so that each STB 102 receives some sub-set of the whole set of active ad assets. The groups to which an STB 102 belongs could be used in this filtering process.

As explained above, all ad assets are stored locally by client 106 and client 106 also knows the groups to which it has been mapped. The following explains how this information is used in the present system to insert selected ads within both live and time shifted content. In a first embodiment, using decisions made by the ad decision service 108, the client 106 processes these decisions and selects an ad asset to insert. Decisions made in this way are referred to herein as in-band decisions. In an alternative embodiment, decisions including the ultimate selection of a specific ad to insert are made by the ad decision service 108 and relayed to the client 106. Decisions made in this way are referred to herein as out-of-band decisions. Each is explained below.

Live content for broadcast to STB 102 is received in acquisition servers within the media delivery platform 112 from upstream transmitter/retransmitters. The MPEG or other video transport stream received in the acquisition servers includes SCTE35 markers indicating locations in the stream where ads are to be inserted, which locations are known as ad avails. In embodiments of the present system, the acquisition servers enhance the SCTE35 protocol with an RTP protocol to allow IP delivery of the video transport stream. As a private extension to the RTP protocol, the SCTE35 markers are enhanced with a "splice-coming" signal and a "splice-out signal in a header of packets in the MPEG transport stream. In embodiments, the header may further include a "splice-in" signal indicating when to return to the underlying video stream. Further details relating to detection, splicing and insertion of ads is set forth in greater detail below. The following section describes how ads are selected for insertion upon detection of an upcoming ad avail.

Once a splice-coming signal is detected by the detection, splicing and insertion engine 130, the engine 130 signals the ad decision processing engine 132 that a decision on an ad avail is required. The decision supplied by ad decision processing engine 132 is based on data supplied by the ad decision service 108. In particular, the ad decision service 108 periodically reviews the ad campaigns then running and prepares a matrix of live ad decisions for all set top boxes in the network. The live ad decision matrix is an ordered list of decisions based on priority of value. In embodiments, value is determined by the ad decision service 108 and in general the most valuable ad assets in a live ad decision matrix will be those that are believed to generate the most monetary value for the operator. The highest value decision is the first row of the live ad decision matrix, while the least valuable ads are towards the bottom of the live ad decision matrix. The matrix may further include a default decision, which may be the last one in the live ad decision matrix.

The ad marking and decision engine 140 requests the ad decisions for upcoming avail minutes before the active window (window during which ad avail marker will arrive) from the ad decision service 108. Ad decision service 108 returns the live ad decision matrix for targeted groups for all ads in that avail. This matrix is provided to the ad marking and decision insertion engine 140 in ad platform 110. As an alternative, engine 140 may periodically receive the live ad decision matrix.

The live ad decision matrix sets forth the ads that are to be inserted in an upcoming ad avail based on group membership. In particular, the live ad decision matrix will set out the ad to be inserted for each group that is associated with a selected ad for the avail. Each ad asset has an ad ID. The live ad decision matrix may in general set forth that if an STB belongs to group 1, that STB should insert ad ID 10; if an STB belongs to group 2, that STB should insert ad ID 15; if an STB belongs to group 3, that STB should insert ad ID 18; and so on for all groups then currently representing ads that are relevant for insertion within the avail. The groups and ad IDs in the previous sentence are by of example only. Not all groups need to be identified in the decision matrix, but only the ones that are to be targeted for those set of decisions. The live ad decision matrix may be represented as follows:

Decision ID (4 bytes) [n iterations]

Group (2 bytes), AdID (4 bytes), AdFatigue (5 bits), Days (3 bits) [m iterations].

The sizes listed above are by way of example only. Each ad avail may include multiple ads. For example, a 60 second ad avail may be filled with two 30 second ads or three 20 second ads. Thus "[n iterations]" represents the number of ads to be inserted into an upcoming avail, 1 to n. The "Group" represents the group ID and "AdID" represents the ad asset that is to be inserted for that group ID. "AdFatigue" and "Days" represent other criteria which can be used by the live ad decision matrix for determining what ads are inserted. These criteria are explained hereinafter. The "[m iterations]" is for the number of groups that need to be targeted for that ad decision for that ad spot in the avail, 1 to m. The values for "AdFatigue" are used by the set top box to prevent excessive exposure of a given ad asset within a specified time period. The "Days" value represents a longevity with which an ad asset is to be kept in recorded media. The concepts associated with both the ad fatigue and longevity values are explained in greater detail below.

For each ad avail, the live ad decision matrix is encoded into the private RTP extension as part of the RTP encapsulation of the video transport stream and multicast by the acquisition server which may be received by the set top boxes in the network. In particular, for each splice-coming signal inserted by the acquisition server into the video transport stream, the ad marking and decision insertion engine 140 also inserts the most updated live ad decision matrix for the upcoming ad avail represented by the splice-coming signal.

Figure 2:
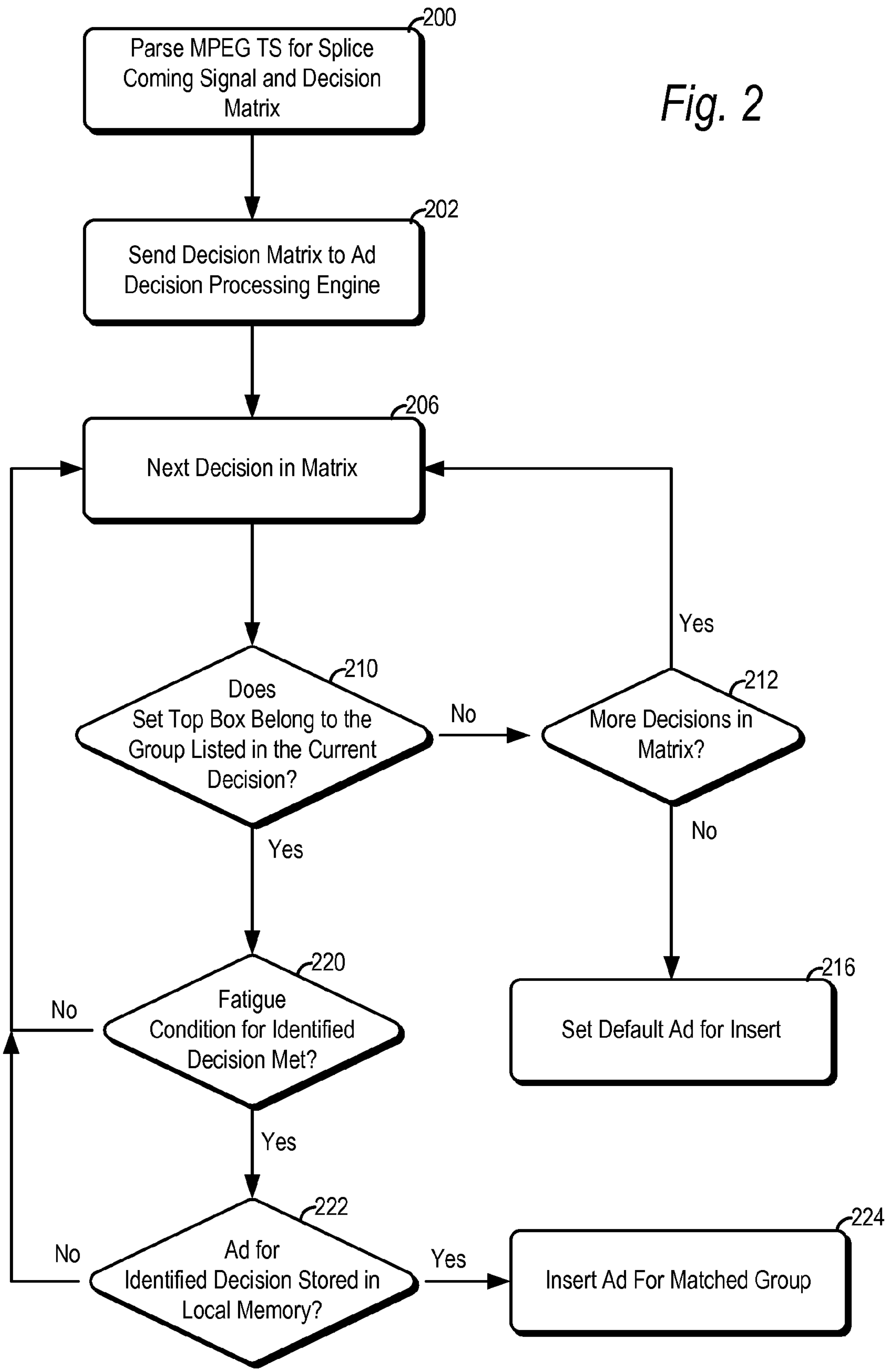
FIG. 2 is a flowchart of an in-band mode of operation for local set top box ad insertion according to an embodiment of the present system.

FIG. 2 represents a flowchart of the operation of the client 106 to dynamically insert an ad asset into a received video transport stream. In step 200, the detection, splicing and insertion engine 130 receives the RTP stream and parses it to identify the splice-coming signal and the live ad decision matrix. The live ad decision matrix is then sent to the ad decision processing engine 132 in step 202. The ad decision processing engine 132 then processes the decisions in the matrix and determines the appropriate ad to insert.

In particular, as indicated above, the highest value ad is the first decision in the live ad decision matrix, while the least valuable ads are towards the bottom of the live ad decision matrix. The default decision is the last one in the ordered matrix. After the live ad decision matrix is received in step 202, the ad decision processing engine 132 processes each decision in the live ad decision matrix top to bottom in steps 206 and 210. If it reaches the end of the matrix without finding an appropriate ad (step 212), the ad decision processing engine 132 sets the default ad as the ad to insert in step 216. In case the default ad is not cached in storage 124, the ad decision processing engine 132 may not insert any ads. The underlying stream will play and the reason for failure may be reported to the ad decision service 108.

If the ad decision processing engine 132 finds a match in step 210 (the decision lists a group to which the STB belongs), it then checks whether the fatigue condition is met in step 220. In particular, as indicated above, the live ad decision matrix also includes an "AdFatigue" value. The present system takes into account that if ad assets are shown to users too often, a user may develop a negative association with the ad. Ad fatigue functionality is important for both the consumer and the advertiser in order to improve user acceptance of ads as well as give the advertiser the ability to more effectively schedule the campaign. The "AdFatigue" value specifies how many times the ad may be displayed to the user within a specified period. Ad fatigue may be implemented in step 220 as one of two alternatives:

Frequency Cap: The ad decision service 108 can provide a value X as part of the in-band decision matrix for each ad to let the STB 102 determine if that ad has been played back more than X times in the past 7 days (or other time period). If so, the ad decision processing engine 132 skips the current matched ad decision in step 210 and goes to the next decision in the matrix in step 206.

Adjacency: While processing the ad decision, the STB 102 will determine if the chosen ad has been played back for that STB within the last hour (or other time period in alternative embodiments). If so, the ad decision processing engine 132 skips the current matched ad decision in step 210 and goes to the next decision in the matrix in step 206.

If the matched decision satisfies the fatigue condition in step 220, the ad decision processing engine 132 next checks in step 222 whether the ad associated with the matched decision is stored in local memory 124. If not, the ad decision processing engine 132 retrieves the next decision in step 206 and continues. However, if the ad associated with the matched decision is in local memory, that ad asset is set as the ad to insert in step 224.

Thus, the in-band decision process will return the cached ad for the highest matched decision in the live ad decision matrix for which the fatigue condition is satisfied. If an ad avail is to be filled with more than one ad asset, steps 206 through 222 are repeated for each additional ad until the ad avail is filled. The ad ID or ad IDs are then sent back to the detection, splicing and insertion engine 130 for insertion and display as explained below.

The above-described system allows local ad insertion at the set top box level using decisions encoded into the video stream. These decisions provide the most recent information from the ad decision service 108 to ensure the most current information is used when inserting ads and to ensure maximum valuation of the ads that are inserted. Ads are inserted at the set top box using pre-cached information (ad assets and groups) to avoid time-critical bandwidth issues. However, the processing intensive operations, such as determining which ad assets to show to which user groups, is performed at the backend, thus allowing relatively simple and inexpensive set top boxes to be used.

An alternative to the in-band decision mode is an out-of-band decision mode. A difference between in-band and out-of-band decisions is the transport of the decision set. As indicated above, in-band decisions are carried as part of the video stream transport. On the other hand, as explained below, out-of-band decisions are carried through a different path that's independent of the video stream. Since the in-band decision set goes to all clients in the network, a given client must select the decision from the decision set that's meant for that given client. However, the out-of-band method unicasts decisions to each client separately. Therefore, it's possible to filter the decision set on the server side so that each individual client gets from the server only the decision it needs. The out-of-band decision mode transfers more decision making to the backend and allows true real time decisions for insertion of ad assets in ad avails.

The out-of-band decision mode is now described with reference to the flowchart of FIG. 3. The out-of-band embodiment leverages the existing Dserver infrastructure of the operator to deliver real time decisions to the device when it encounters an ad marker. The Dservers are part of the media delivery platform 112, and are typically used for error correction and support. The Dserver command and control technology is exploited to return appropriate decision in real time to the device.

In the out-of-band mode of operation, the ad decision service 108 periodically sends ad decisions for all avails for all groups to the Dservers of media delivery platform 112. The decisions may be delivered at least every 1 to 2 hours, but it may be more or less frequent than that in further embodiments. In embodiments, the transfer of decisions from the ad decision service 108 to the Dservers may be done in real time. In step 300, the STB 102 calls out to the Dservers at the time it encounters an ad marker (the splice-coming signal) and passes a group membership list in the request. In step 302, the Dservers return the set of appropriate decisions for a particular avail for the groups the STB belongs to. This set of appropriate decisions will include a list of candidate ad assets to insert in a priority order. In embodiments, the decision is only for the channel the STB 102 is tuned to, though it may be all channels in further embodiments. In the above embodiment, decisions are sent down to the STB 102 in response to contact by the STB. However, in an alternative embodiment, the Dserver can proactively send decisions to the client, for example upon receiving an update.

The ad decision processing engine 132 then processes the appropriate decision based on the availability of ads on the local storage as well as ad fatigue as described above. In step 306, the ad decision processing engine 132 determines whether a decision was received from the Dservers, and if so, whether one or more of the candidate ads are stored in local ad storage 124 and satisfies the fatigue condition. If no decision satisfies these conditions, the ad decision processing engine 132 may fall back in step 308 to the ad decision that arrived in the in-band solution as provided by the live ad decision matrix in the RTP extension (described above with respect to FIG. 2).

Assuming one or more candidate ad insert decisions were received from the Dservers, the highest value cached ad that satisfies the fatigue condition is inserted in step 310. The decisions sent down to the STB 102 in the out-of-band embodiment look as they do for the in-band embodiment, but are only for the specific groups the STB belongs to. Thus, they are a smaller size and require less processing at the STB.

The above embodiments have described both in-band and out-of-band systems for inserting ads in live playback of content. However, users frequently record content for later playback. The present system allows for local ad insertion in such time shifted content playback. When the content was initially recorded, and an ad avail came up, the present system assigned an ad for insertion in that ad avail, for example via the in-band ad insertion method as described above. However, when the time-shifted content is eventually played, an asset originally selected for insertion may now be stale. For example, the ad may have been for an event which has passed by the time the recording is played, or the ad campaign for an ad may have expired. There are additional reasons why an originally selected ad may not be the best ad to play when the content is time shifted. The present system accordingly performs a new evaluation upon detection of an ad avail in recorded content, and the originally selected ad asset may or may not be replaced as explained below.

When live content is being shown and viewed by many viewers, an ad avail comes up at the same time for all of these viewers, and there may not be sufficient bandwidth for all set top boxes to query the backend per the out-of-band embodiment described above. This bandwidth problem for live synchronous playback of content is taken care of by the in-band embodiment. However, when recorded content is time shifted for playback, the ad avails are no longer synchronous with other set top boxes, and the same concerns over bandwidth for filling ad avails in live playback does not exist. As such, when recorded content is played back, the present system can query the backend upon detection of an ad avail in order to get the most up to date information available from the ad decision service. It is understood that the following description of ad insertion into time-shifted content may also be used for live insertion in the in-band embodiment described above for systems having sufficiently large bandwidth.

Insertion of ad assets into time shifted content is explained with reference to FIG. 4. Initially, the set top box determines when recorded content is played back in step 400. When playback is detected, the ad decision processing engine 132 identifies all ad avails in the recording in step 402. The client 106 would have recorded the ad markings for these ad avails in storage at the time of recording the content. In step 406, the ad decision processing engine 132 sends a request to a DVR ad management engine 150 for ad decisions for all ad avails. In making this request, the engine 132 also sends all identifying characteristics of the set top box, including for example the set top box ID, group membership and other parameters of the set top box.

The DVR ad management engine 150 in turn sends a request to the ad decision service 108 for decisions on all ad avails in the recorded content. The request from the ad management engine 150 to the ad decision service may be a PlacementRequest as defined in SCTE130, which relates to a set of services facilitating ad insertion. SCTE130 is incorporated by reference herein in its entirety. The ad decision service may respond with decisions that are forwarded in step 408 to the ad decision processing engine 132 via the DVR ad management engine 150. The response may be a PlacementResponse as defined in SCTE130.

After the list of candidate ads is received by the ad decision processing engine 132, the client waits for detection of an ad avail from the detection, splicing and insertion engine 130. Upon detection of an ad avail in step 410, the ad decision and processing engine 132 determines in step 412 whether one or more candidate ad assets were received and are available for insertion in the ad avail. If not, the playback continues with the originally selected ad asset in step 414. In particular, when the content was originally recorded, and an ad avail came up, the present system assigned an ad for insertion in that ad avail in accordance with one of the above-described embodiments. If no ad assets are received in step 408, or if the received ad assets are not available, the originally selected ad asset(s) may be inserted in step 414. If the originally selected ad asset is not available from local storage, a default ad asset may instead be inserted.

If one or more candidate ad assets are identified in step 412, before they replace the originally selected ad asset, the longevity value for the original ad asset is checked. In particular, as discussed above, when the live ad decision matrix is downloaded as part of the RTP video transport stream, the last three bits for each decision in the decision matrix provide a “Days” value which is the live +3, 7 longevity value. This value is set by the advertiser 114, and it is used to determine whether and how long to keep the ad if the content is recorded for later playback. In one embodiment, the “Days” longevity value in the live ad decision matrix may be 0, 3 or 7. If the value is 0, a selected ad may be replaced if it is not played back live. If the value is 3, a selected ad is maintained for three days. So if the content is played back within three days of recording, the original ad is inserted regardless of the updated list of candidates received from the ad decision service. If the value is 7, as long as the content is played within seven days of recording, the original ad is inserted regardless of the updated list of candidates received from the ad decision service. The values of 3 and 7 days are by way of example, more, less or other values may be used instead of or in addition to 3 and 7 days.

Thus, if one or more candidate ad assets are identified in step 412, before they replace the originally selected ad asset, the longevity value for the original ad asset is checked in step 418. If the value is 0 or is otherwise exceeded, the ad decision processing engine 132 inserts the ad decision made by the ad decision service 108 in step 420. If the specified longevity value is not exceeded in step 418, the originally selected ad is inserted in step 414.

In embodiments, the ad selected in steps 400-420 is inserted during live playback of recorded content, but also during fast forward and rewind of the content. Often viewers will use ads as reference points when fast forwarding and rewinding, i.e., they are looking for content that follows or preceded a particular ad. As such, insertion of the selected ad asset during fast forward and rewind allows the selected ad assets to be used in this manner.

Figure 3:
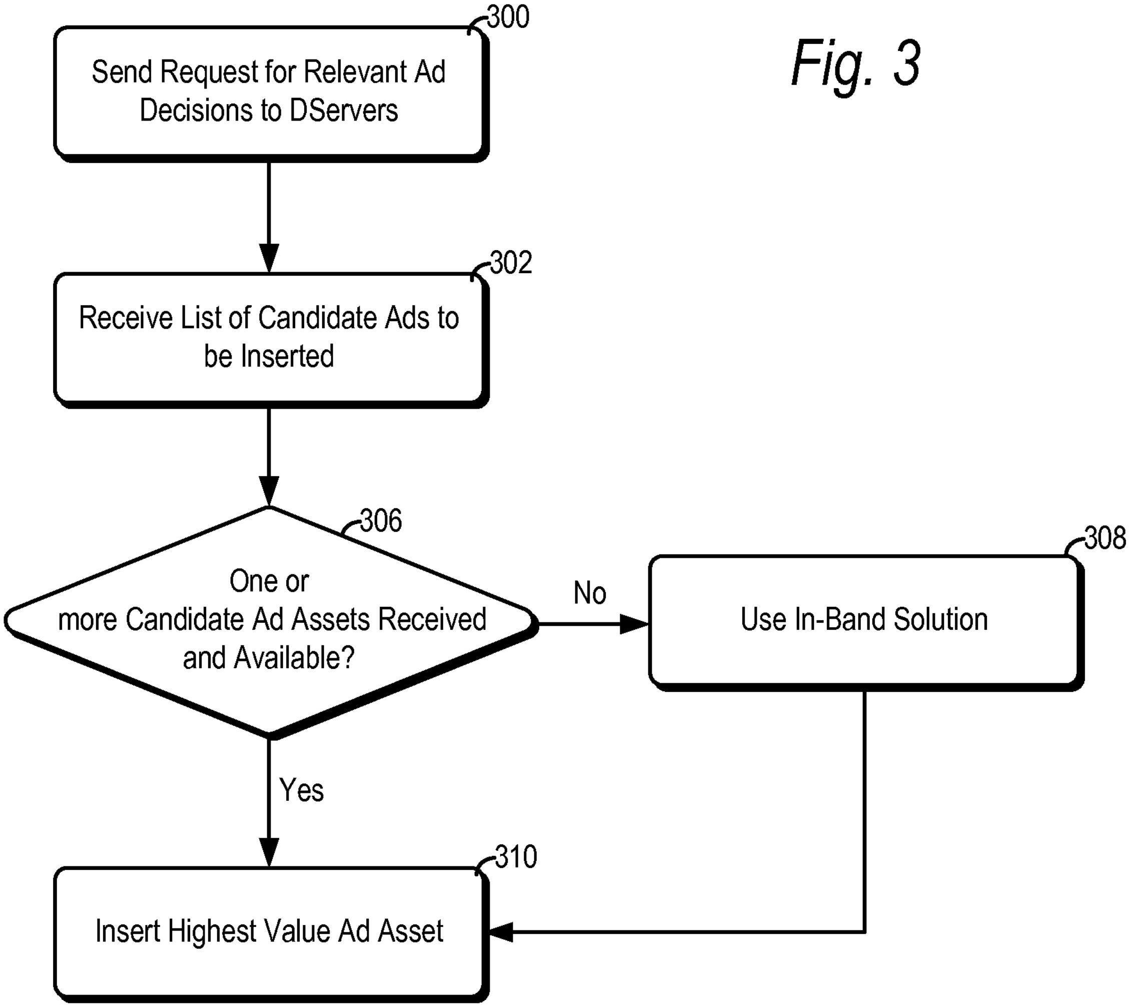
FIG. 3 is a flowchart of an out-of-band mode of operation for local set top box ad insertion according to an embodiment of the present system.
Figure 4:
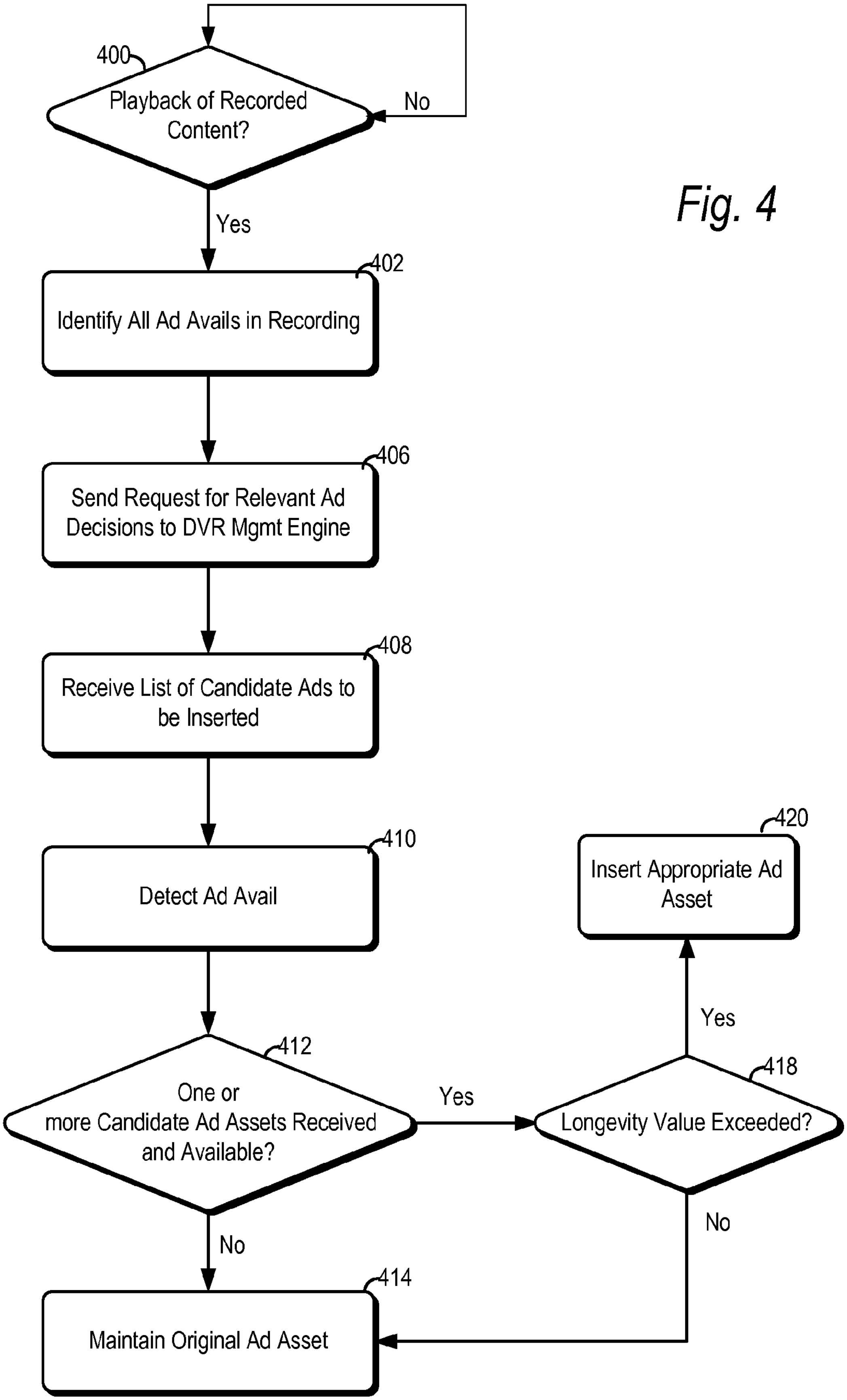
FIG. 4 is a flowchart of local set top box ad insertion into time shifted recorded media according to an embodiment of the present system.

FIGS. 2-4 illustrate methods of selecting an ad asset by the set top box 102 for insertion in an ad avail based on decisions received from the ad decision service. Once an ad is selected, it needs to be inserted into the video stream. The detection, splicing and insertion engine 130 is responsible for detecting the ad splice point via the splice in and out points inserted in the RTP extension. Once the ad decision is made, this component interacts with the ad decision processing engine 132 to fetch the ad asset from storage 124 in the set top box and insert the ad into the video stream. In particular, upon receipt of the “splice-out” signal, the detection, splicing and insertion engine 130 retrieves the selected ad asset from storage 124 on the STB 102. It may happen that set top boxes in a home are setup as master and slave, so that one or more STB 102 may have no storage 124. In this instance, the detection, splicing and insertion engine 130 retrieves the selected ad from the master STB 102 in the home that includes storage 124.

Once the ad insert is retrieved, the detection, splicing and insertion engine 130 ensures that the streams match and calculates the insertion point to switch the feeds between the live/recorded and the locally stored ad asset. After splicing, the underlying stream continues to play in the background. When the “splice-in” signal in the underlying stream is detected after the one or more stored ads have run, the feed is again switched back from the local ad to the streamed video feed.

The splicing in accordance with the present system is accomplished using much simpler equipment than the head end/cable splicers used for conventional video splice-in. This is made possible by controlling the stored assets to be compatible with the video transport stream so that switching between the streamed video and the locally stored ads is seamless. In order to accomplish this, the stored ad assets may be encoded at the same setting as the corresponding video streams, and the stored ads may have closed GOPs (groups of pictures). Ads may be quality checked by the operator to ensure correctness of AV content. Both SD and HD ads are included. Only SD ads may be inserted into SD streams. Both SD and HD ads may be inserted into HD streams. Splice in and out points may be IDR frames for both ads and live stream. If the stream is recorded by the DVR, then all information in the RTP extension including ad markings as well as decision rule sets may be stored locally on the set top box 102.

In the embodiments described above, the present system selects a locally stored ad asset for insertion into a video stream. However, in an alternative embodiment, instead of inserting a locally stored ad asset in a detected ad avail, the present system may instead insert content multicast to a plurality of set top boxes. In this alternative embodiment, upon detecting an upcoming ad avail, the decision may be for the client to tune into some alternate stream multicast to the plurality of set top boxes. Upon completion of the ad avail, the stream can return to the underlying content.

As indicated in the Background, an important area of focus is feedback and measuring of ad assets. The present system provides a variety of data and tools for advanced measurement and tracking of every ad served and interacted with by providing granular ad delivery and playback data. Client 106 further includes a client ad measurement engine 142 which is responsible for collecting all data around ad playback at all STBs in a household. The engine 142 is further responsible for aggregating and preparing that data, which is in turn sent to the ad decision service 108 via an ad measurement engine 160 in ad platform 110. The ad measurement engine 160 integrates with the ad decision service 108 through public interfaces to report on all ad playback measurement for all set top boxes.

The data returned from the client ad measurement engine 142 is important in measuring success of an ad campaign and for forecasting future ad decisions. Timeliness of this data helps in improving these decisions and prevents problems such as over-serving ads, i.e., selecting and inserting an ad after the total number of ads the advertiser agreed to pay for has been displayed. The ad measurement engines in the platform 110 and on client 106 provide a reliable mechanism for reporting impressions with close to 100% reliability, assuming availability of ad decision service 108. The ad measurement engine 160 in platform 110 also logs every impression reported to the ad decision service, for future validation.

The client ad measurement engine 142 at the STB 102 collects all impressions for ads inserted during live and time shifted content playback. It then periodically reports the bucket of impressions to the ad measurement engine 160, for example every 12 hours, though it may be more or less frequent in alternative embodiments. In embodiments, each set top box can send its measurements to the ad measurement engine 160. Alternatively, the measurements can be rolled-up. That is, each client can talk to a master in the household that collects a rolled-up measurement that is then uploaded to the ad measurement engine 160.

In embodiments, every set top box reports impressions at a different time interval that is randomly selected over the 12 hour period. This means that after playback of a certain avail, some STBs report impressions within 1 hour of play back to the ad measurement component at the server, and some STBs report impressions within at most 12 hours after that avail. The ad measurement engine 160 at platform 110 further aggregates all impressions from the client and reports them back to the ad decision service 108. Thus, for any avail, rolling measurement will be provided to the ad decision service 108 which will be complete within 12 hours (or whichever time period is selected within which to complete random reporting).

In embodiments, every impression reported back to the ad decision service 108 includes:

- the STB ID
- the ad decision ID provided by the ad decision service
- the ID of the ad played back
- the timestamp the ad was played back
- the duration of the ad played back until the first user interruption
- a status Code: Success, Failure due to ad unavailability, Failure due to stream management, Failure other
- the type of user interruption during ad playback (rewind, fast forward, stop, unexpected, none)
- a time and event for the last user interaction with the STB. This will allow the ad decision service 108 to account for scenarios around viewers not watching TV but who have their STB on. In embodiments, if no interaction with the STB is detected within a given period of time, for example one-half hour, the present system may assume that the STB is on, but the user is not viewing the TV or monitor.

This information is collected by the ad decision service 108 and made available to advertisers 114 so that they can get a clear picture of ads within their advertising campaign and their effectiveness. The advertiser is able to determine which ads were viewed and which ads were not. And instead of a sampling, the advertiser may receive this information for every ad in their campaign.

In alternative embodiments, it is understood that the functionality of the above-described components may be shifted vertically (between the back-end and the set top box) and/or horizontally (between the ad decision service 108, ad platform 110 and media delivery platform 112). For example, in one alternative horizontal shifting embodiment, the ad decision service 108 could have scaled-up capacity to handle the functionality of the media delivery service 112 described above of accepting synchronous requests by the clients in the network. In a vertical shifting embodiment, the decision making functionality of the ad marking and decision insertion engine 140 and/or the measurement functionality of the ad measurement engine 160 may be performed by the client 106. Other horizontal and vertical shifting of functionality is contemplated.

The above described methods for dynamic local ad insertion at the set top box level may be described in the general context of computer executable instructions, such as program modules, being executed by a computer (which may be any of the servers forming part of the ad decision service 108, ad platform 110, media delivery platform 112 and/or set top box 102). Generally, program modules include routines, programs, objects, components, data structures, etc., that perform particular tasks or implement particular abstract data types. The present system may also be practiced in distributed computing environments where tasks are performed by remote processing devices that are linked through a communication network. In a distributed computing environment, program modules may be located in both local and remote computer storage media including memory storage devices.

Figure 5:
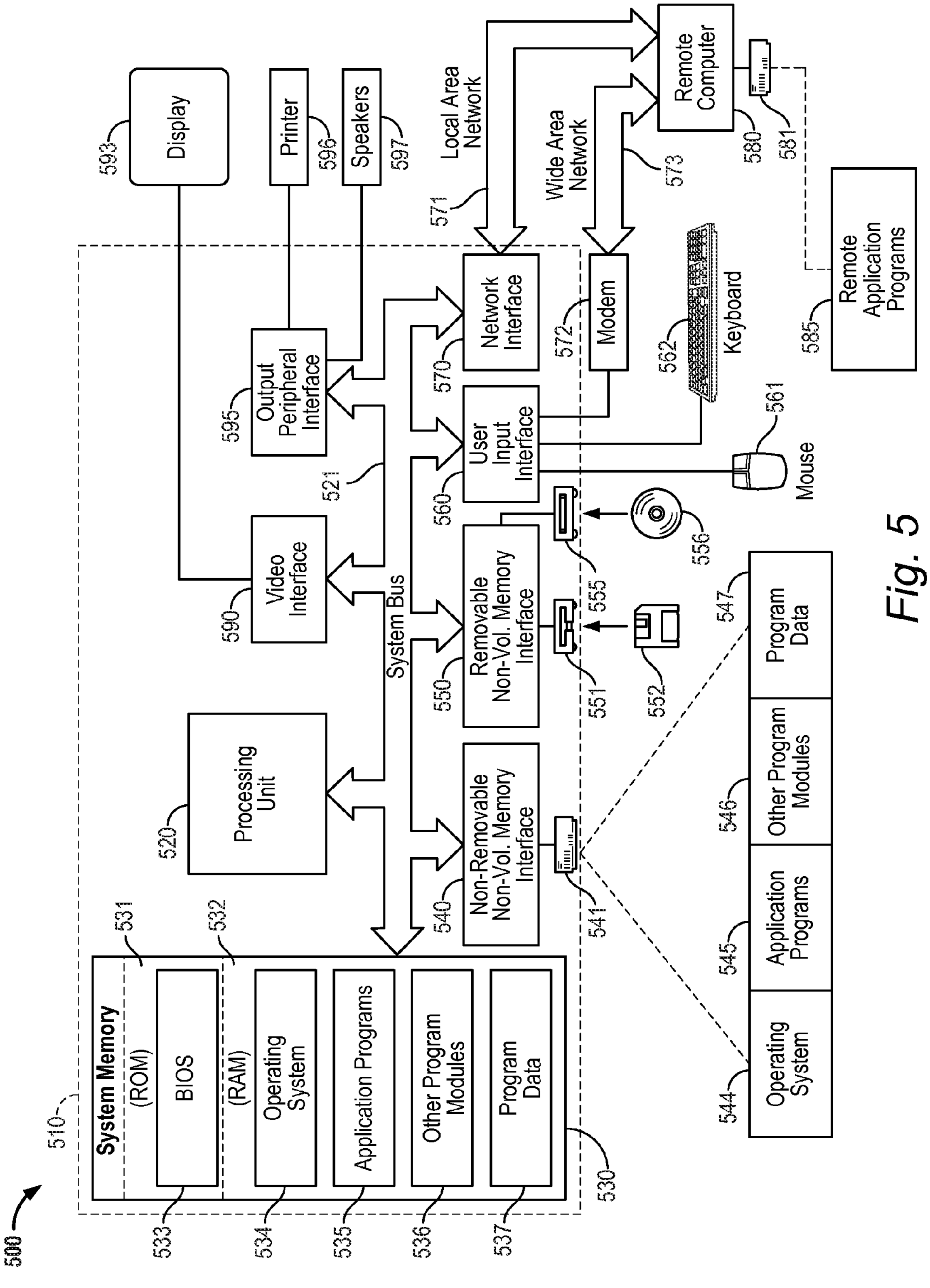
FIG. 5 is a block diagram of a computing environment for implementing local set top box ad insertion according to an embodiment of the present system.

With reference to FIG. 5, a computing environment for implementing aspects of the present system includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tapes, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer 510. In FIG. 5, for example, hard disk drive 541 is illustrated as storing operating system 544, application programs 545, other program modules 546, and program data 547. These components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 593, discussed above, or other type of display device is also connected to the system bus 521 via an interface, such as a video interface 590. In addition to the monitor 120, computer 510 may also include other peripheral output devices such as speakers 597 and printer 595, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570 (such as interface 126). When used in a WAN networking environment, the computer 510 typically includes a modem 572 or other means for establishing communication over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of receiving feedback on ad assets inserted within an ad avail in a video stream at a client device, the method comprising the steps of:

(a) defining a plurality of ad assets, the ad assets being compatible with the video stream;

(b) transmitting the ad assets to the client device, the ad assets being downloaded to the client device in non-critical time periods without regard to upcoming ad avail time slots, the client device then receiving an indication of an upcoming ad avail time slot, and determining one or more ad assets to insert in the upcoming ad avail time slot by the steps of: i) ranking the ad assets for a group to which the client device belongs, ii) reviewing the ranked ad assets for the group to which the client device belongs, in an order of their ranking, until an ad asset is identified which has been transmitted to the client device, iii) selecting a highest ranked ad asset which has been transmitted to the client device, and iii) selecting a default ad asset for the group if no ad asset in the ranking of ad assets for the group is stored on the client device;

(c) receiving a list of all ad assets inserted into ad avails by the one or more client devices, and storing a total number of times a first ad asset has been inserted into an ad avail by the one or more client devices;

(d) receiving information regarding user playback of each ad asset included in the list received in said step (c); and (e) determining whether to maintain the ad asset based on an evaluation of the list received in said step (c) and the information received in said step (d), said step (e) including the step of removing the first ad asset if it is determined that the total number of times the ad asset has been inserted into an ad avail has exceeded a predetermined number of insertions for the first ad asset.

2. The method of claim 1, wherein said steps (c) and (d) of receiving the list of inserted ad assets and information regarding user playback comprises the step of receiving the list and information from the client device at random intervals over a predetermined time period.

3. The method of claim 2, wherein said step of receiving the list and information from the client device at random intervals over a predetermined time period comprises the step of receiving the list and information over a twelve hour time period.

4. The method of claim 1, wherein said step (d) of receiving information regarding user playback comprises the step of receiving information of a user fast forwarding through an inserted ad.

5. The method of claim 1, wherein said step (d) of receiving information regarding user playback comprises the step of receiving information of a user rewinding an inserted ad or pausing on an inserted ad.

6. The method of claim 1, further comprising the step of receiving one or more of:

(a) an ID of a client device that played back an ad asset;

(b) an ID of the ad asset that was played back;

(c) a timestamp of when the ad was played back; and (d) a duration of the ad playback until first user interruption.

7. The method of claim 1, wherein said step (d) of receiving information regarding user playback comprises the step of receiving a status code indicating one of:

(a) whether the ad was successfully played back;

(b) whether the ad was not played back due to its not be stored locally on a client device that sought to play it; and (c) whether the ad was not played back due to transmission stream errors.

8. The method of claim 1, wherein said step (d) of receiving information regarding user playback comprises the step of receiving an indication of user interaction with the client device in a time period during which an ad was played, the information of user interaction during this time period indicating whether the client device was on, but the user was not watching the associated television or monitor.

9. The method of claim 1, wherein the step of monitoring a number of times an ad asset is played back comprises the step of monitoring live playbacks and playback of the ad asset in time shifted recording of the ad asset.

10. A method of inserting local ad assets within an ad avail in a video stream at one or more client devices and receiving feedback on the inserted ad assets, the method comprising the steps of:

(a) defining a plurality of ad assets, the ad assets being compatible with the video stream;

(b) defining one or more groups to which a client device is a member, the client device being added to a group of the one or more groups based on attributes of a user of the client device;

(c) transmitting the ad assets to the one or more client devices;

(d) for each group of the one or more groups, ranking the ad assets in an order, the one or more groups, and their ranked order of ad assets, forming a decision matrix;

(e) transmitting the decision matrix to the client device for the client device to select an ad asset by: i) reviewing the ranked ad assets for the group to which the client device belongs, in an order of their ranking, until an ad asset is identified which is both stored on the client device and satisfies a fatigue condition limiting how often an ad asset may be displayed in an ad avail, ii) selecting a highest ranked ad asset which is stored on the client device and satisfies a fatigue condition, and iii) selecting a default ad asset for the group if no ad asset in the ranking of ad assets for the group is both stored on the client device and satisfies the fatigue condition;

(f) receiving a list of all ad assets inserted into ad avails by the one or more client devices;

(g) receiving information regarding user playback of each ad asset including in the list received in said step (f); and (h) determining whether to maintain the ad asset based on an evaluation of the list received in said step (f) and the information received in said step (g).

11. The method of claim 10, wherein said steps (f) and (g) of receiving the list of inserted ad assets and information regarding user playback comprises the step of receiving the list and information from all client devices of the one or more client devices at random intervals over a predetermined time period.

12. The method of claim 10, wherein said step (g) of receiving information regarding user playback comprises the step of receiving information of a user fast forwarding or rewinding through an inserted ad or pausing on an inserted ad.

13. The method of claim 10, wherein said step (g) of receiving information regarding user playback comprises the step of receiving a status code indicating one of:

(a) whether the ad was successfully played back;

(b) whether the ad was not played back due to its not be stored locally on a client device that sought to play it; and (c) whether the ad was not played back due to transmission stream errors.

14. The method of claim 10, wherein said step (g) of receiving information regarding user playback comprises the step of receiving an indication of user interaction with the client device in a time period during which an ad was played, the information of user interaction during this time period indicating whether the client device was on, but the user was not watching the associated television or monitor.

15. The method of claim 10, further comprising the step of monitoring a number of times an ad asset is played across all client devices of the one or more client devices and limiting payback of an ad asset to a predetermined number of playbacks.

16. The method of claim 15, wherein the step of monitoring a number of times an ad asset is played back comprises the step of monitoring live playbacks and playbacks of the ad asset in time shifted recording of the ad asset.

* * * * *